US006683598B1

United States Patent
Gibson

(10) Patent No.: US 6,683,598 B1
(45) Date of Patent: Jan. 27, 2004

(54) MOUSE OPTICAL SAMPLING SCHEME

(75) Inventor: Greg S. Gibson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/388,050

(22) Filed: Sep. 1, 1999

(51) Int. Cl.[7] .............................................. G09G 5/08
(52) U.S. Cl. ....................... 345/166; 345/163; 345/165; 345/167; 345/207; 250/201.1; 250/221; 250/559.32
(58) Field of Search ................................ 345/166, 165, 345/207, 163, 167; 250/201.1, 221, 559.32

(56) References Cited

U.S. PATENT DOCUMENTS

| 4,150,342 A | * | 4/1979 | Johnston et al. ............... 372/32 |
| 4,868,549 A | * | 9/1989 | Affinito et al. .............. 340/710 |
| 4,924,216 A | * | 5/1990 | Leung .......................... 463/38 |
| 4,961,138 A | * | 10/1990 | Gorniak ...................... 364/200 |
| 5,256,913 A | | 10/1993 | Sommer ...................... 307/311 |
| 5,422,693 A | * | 6/1995 | Vogeley et al. .............. 353/122 |
| 5,459,489 A | * | 10/1995 | Redford ...................... 345/179 |
| 5,541,623 A | * | 7/1996 | Engstrom .................... 345/165 |
| 5,551,016 A | * | 8/1996 | Loeb et al. .................. 713/400 |
| 5,557,440 A | * | 9/1996 | Hanson et al. ............... 359/161 |
| 5,854,482 A | | 12/1998 | Bidiville et al. |
| 5,872,533 A | * | 2/1999 | Snyder et al. ............... 341/119 |
| 5,898,170 A | * | 4/1999 | Featheston ............. 250/231.18 |
| 6,124,587 A | * | 9/2000 | Bidiville et al. ............. 345/165 |
| 6,144,366 A | * | 11/2000 | Numazaki et al. ........... 345/156 |
| 6,175,358 B1 | * | 1/2001 | Scott-Jackson et al. ...... 345/161 |
| 6,219,034 B1 | * | 4/2001 | Elbing et al. ................ 345/158 |
| 6,269,169 B1 | * | 7/2001 | Funk et al. .................. 382/100 |

* cited by examiner

Primary Examiner—Richard Hjerpe
Assistant Examiner—Abbas I Abdulselam
(74) Attorney, Agent, or Firm—Banner & Witcoff, Ltd.

(57) ABSTRACT

Methods and systems for implementing an improved mouse optical sampling scheme are disclosed. At least one counter state machine is used to control at least one PTR state machine. At least one PTR state machine is used at a sample rate in order to determine the appropriate output for the mouse. The sample rate is adjusted to minimize the system sensitivity to poor duty cycle regulation. In addition, $T_{min}$ value(s) are adjusted in order to optimize the duty cycle for each PTR state machine. The mouse output is then provided to the computer. Consequently, by optimizing the duty cycle for each PTR state machine and minimizing its sensitivity to poor duty cycle regulation, a greater dynamic range of optical components can be employed in the mouse.

20 Claims, 7 Drawing Sheets

MOUSE OPTICAL SAMPLING SCHEME

FIELD OF THE INVENTION

The present invention relates to the field of pointing devices for use with personal computers and, in particular, to methods and systems for implementing an improved sampling scheme that enables a greater dynamic range of optical components to be used in a computer mouse.

BACKGROUND OF THE INVENTION

U.S. Pat. No. 5,256,913 to Sommer ("the '913 patent") discloses electronic components and circuits used to sense motion differences in a computer mouse. As detailed in the '913 patent, a mouse typically uses optical components, such as light emitting diode (LED) and phototransistor (PTR) pairs, to determine motion. However, these components have a large manufacturing variability. This variability can cause problems in determining motion because of the limited dynamic range in the mouse electrical system.

Various methods have been used in the past in order to overcome this manufacturing variability. One method has been to test and sort each optical component to make sure that the component matches the system's requirements. LEDs and photodetectors (e.g. phototransistors) from the same manufacturer, made on the same day by the same machine may exhibit widely varying brightness and sensitivity. For example, some LEDs are brighter than others with the same amount of applied power. Similarly, some photodetectors can see the same amount of light better other photodetectors. In this method, bright LEDs are paired with weak photodetectors, and dim LEDs are paired with strong photodetectors. Consequently, the strengths and weaknesses of the optical components are balanced out. Thus, in this method, components are sorted by strength into bins and the manufacturer puts appropriately matched optical components into the mice.

Another method is to design complex electrical circuits that dynamically adjust the system gain in order to compensate for optical-component variability. For example, it is common to use resistors to control the strength of optical components and their corresponding signals. During manufacturing, a mouse circuit board is built and powered up. A test device measures the strength of the signals. Variable resistors are then adjusted to compensate for the strengths and weaknesses of the optical components.

Unfortunately, the above methods are difficult and expensive to use in production. Further, employing these methods to overcome manufacturing variability significantly increase the manufacturing cost per unit of each mouse. In addition, using these methods slows production of the mice, further negatively impacting profitability.

Accordingly, it is an object of the present invention to provide an improved mouse optical sampling scheme that enables a greater dynamic range of optical components to be used in a computer mouse.

SUMMARY OF THE INVENTION

The present invention can be broadly summarized as follows. In one embodiment, the present invention is a method of determining motion in a mouse that is used in conjunction with a computer. At least one counter state machine is used to control at least one PTR state machine. At least one PTR state machine is used at a sample rate to determine the appropriate output for the mouse. The sample rate is adjusted, preferably after each sample, in order to minimize the system sensitivity to poor duty cycle regulation. In addition, $T_{min}$ value(s) are adjusted in order to optimize the duty cycle for each PTR state machine. The mouse output is then provided to the computer. By optimizing the duty cycle for each PTR state machine and minimizing its sensitivity to poor duty cycle regulation, a greater dynamic range of optical components can be employed in the mouse.

Of course, the method and system of this embodiment may also include other additional elements and/or steps.

Other embodiments are disclosed and claimed herein as well.

BRIEF DESCRIPTION OF THE DRAWINGS

The present invention may take physical form in certain parts and steps, embodiments of which will be described in detail in this specification and illustrated in the accompanying drawings which form a part hereof, wherein.

DETAILED DESCRIPTION OF THE INVENTION

Figure 1:
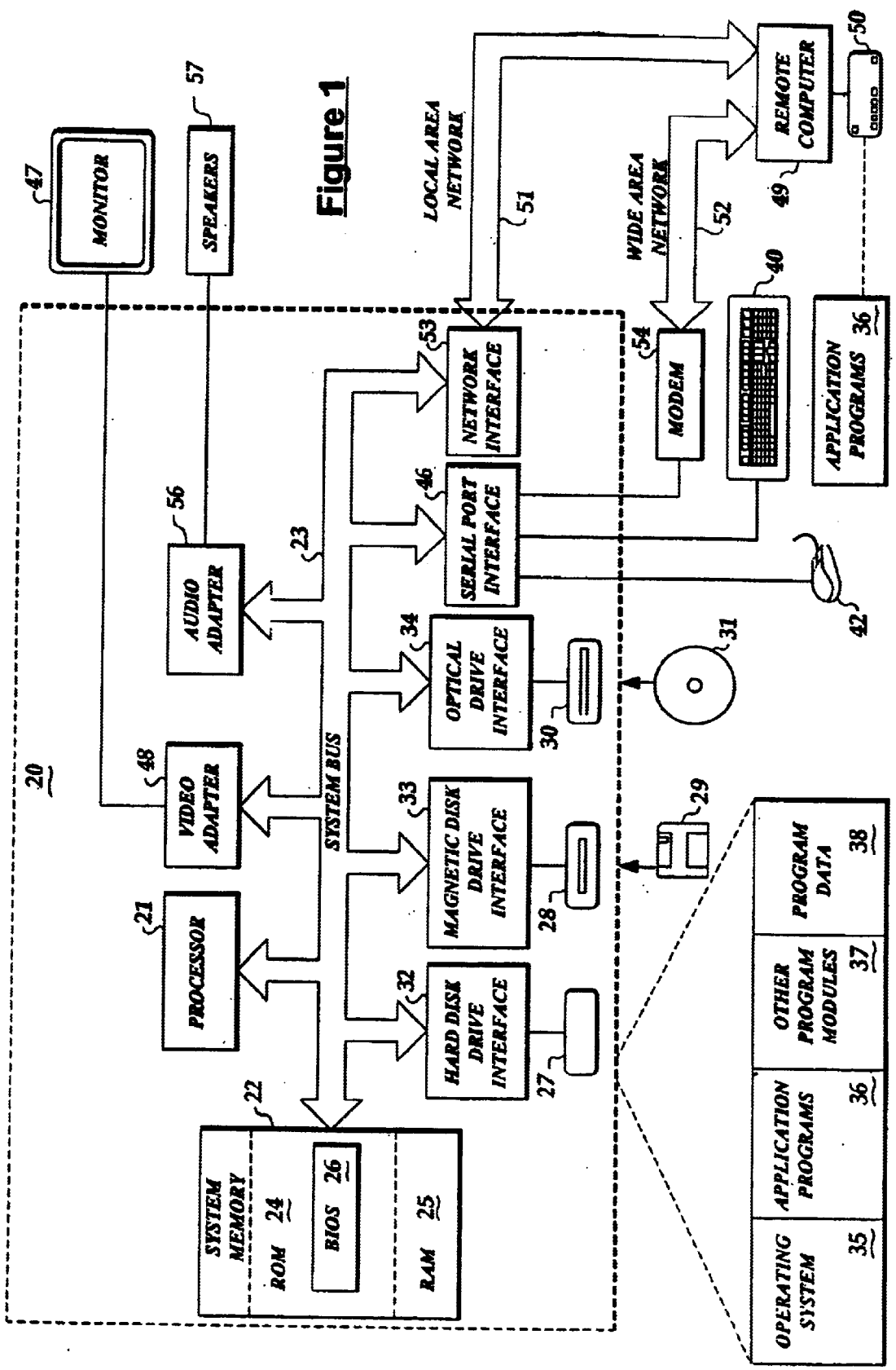
FIG. 1 is a block diagram of a general-purpose computer system capable of being used in conjunction with the present invention.

The present invention provides methods and systems for providing an improved mouse optical sampling scheme that enables a greater dynamic range of optical components to be used in a computer mouse. In particular, this invention overcomes the problems of the prior art by using a dynamic sample rate that is dependent on the response time ($T_{min}$), which is preferably adjusted each time a sample is evaluated. With this adjustment (i.e. learning), it only takes one sample to adjust $T_{min}$ from its maximum value to its optimum value. In addition, the present invention uses a higher $T_{min}$ resolution that increases mouse tracking performance by: obviating duty cycle errors, providing a better range of duty cycle adjustment, and providing a faster sample rate for fast optical components (i.e. small $T_{min}$ values). Thus, this invention overcomes the problems of the prior art and enables manufacturers to use a greater dynamic range of optical components in computer mice.

Definitions

Before proceeding with a detailed discussion of this case, the following terms are defined in order to facilitate a better understanding of the present invention.

An "adjustment component" is the XYZ photodetector adjustment circuitry.

A "button logic component" is the standard circuitry that takes input from external buttons (i.e. switches) on a mouse and provides this data to the application interface.

A "comparator" is a device that compares two quantities and determines their equality.

A "counter" is a variable in programming, a hardware chip or a portion thereof, which is used to keep track of anything that must be counted.

A "counter state machine" is the state machine that monitors elapsed time for the optical component sampling.

"Digital resolution" is the number of bits used to record the value of a sample in a digitized signal.

"Discharge time" is the requisite time period to dissipate the charge on all phototransistors being monitored by the PTR state machine.

"Duty cycle" is the percentage of time that the PTR signal states are at a logical "high" value. The ideal duty cycle is 50% for a phototransistor of a mouse moving at a constant speed.

A "light emitting diode" (LED) a semiconductor diode that emits light when charged.

A "mouse" is a pointing device that enables a computer user to input location data into a computer. This data is typically used to locate an icon, such as an arrow or crosshair, on a graphical display.

"Phase" refers to the electrical signal timing between two photodetectors used for a given axis of a mouse. The phase is determined by the relationship between the photosource, photodetector and encoder wheel in a mouse.

A "photodetector" is a device that senses the light pulses in an optical fiber and converts them into electrical pulses. It uses the principle of photoconductivity, which is exhibited in certain materials that change their electrical conductivity when exposed to light.

A "phototransistor" (PTR) is a type of photodetector and, in particular, is a transistor with photodetector capabilities.

A "PTR state machine" is a state machine the monitors the output of the photodetectors which determine movement of a mouse.

A "response time" ($T_{min}$) refers to the minimum amount of time that it takes a photodetector to detect a voltage that equals or exceeds a threshold voltage ($V_{th}$) after an LED is turned on.

A "sample rate" is, in digitizing operations such as with a mouse, the frequency with which samples are taken and converted into digital form. The sampling frequency must be at least twice that of the analog frequency being captured.

A "state machine," also called a finite state machine, is a computing device designed with the operational states required to solve a specific problem. The circuits are minimized, specialized and optimized for the application. For example, chips in audio, video and imaging controllers are often designed as state machines, because they can provide faster performance at lower cost than a general-purpose CPU.

"Time to cross the threshold" ($T_{cross}$) refers to the amount of time it takes for the output of a photosource and corresponding input on a photodetector to cross a threshold voltage that differentiates a logical "zero" (0) from a "one" (1).

"Universal Serial Bus" (USB) is a hardware interface for low-speed peripherals such as the keyboard, mouse, joystick, scanner, printer and telephony devices.

An "XY learning component" is the circuitry that determines when to reset the X and Y axis $T_{min}$ values to their maximum value.

General-Purpose Personal Computer

Now therefore, in accordance with the present invention, a mouse is used in conjunction with a computer, such as a general-purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer, single chip microprocessor or application specific integrated circuit. Generally, program modules include routines, programs, objects, components, data structures, etc. that perform particular tasks or implement particular abstract data types. Moreover, those skilled in the art will appreciate that the invention maybe practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device. This device is in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown. In addition, the computer 20 includes a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, other types of computer-readable media capable of storing data that is, accessible by a computer may also be used. Examples of computer-readable media include magnetic cassettes, flash memory cards, digital versatile disks, Bernoulli cartridges, random access memories (RAMs), read only memories (ROM), and the like.

A number of program modules may be stored on the hard disk, magnetic disk 29, optical disk 31, ROM 24 or RAM 25, including an operating system 35, one or more application programs 36, other program modules or components 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers. Each remote computer 49 may be another personal computer, a server, a router, a network PC, a peer device or other common network node. And, each remote computer 49 typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 49 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Electronic Circuitry Capable of Being Used in Mouse

Figure 2:
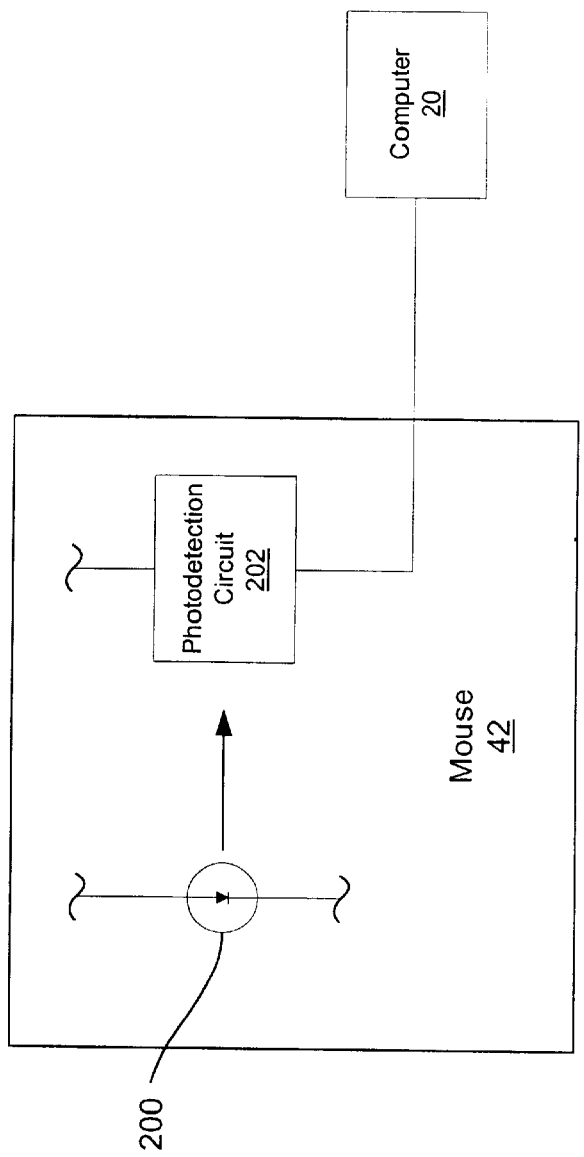
FIG. 2 is a partial block diagram of the motioni-difference-senising portions of a computer mouse.

The electronic circuitry capable of being used in a mouse in accordance with the present invention is idealistically represented in FIG. 2. As shown, the motion-difference-sensing-circuitry portions of a computer mouse 42 generally include a photosource, such as an LED 200, and a photodetection circuit 202. A substantially more detailed description of this common circuitry is set forth in the '913 patent.

As mentioned in the Background of the Invention, the '913 patent discloses electronic components and circuits used to sense motion differences in a computer mouse. Further, the '913 patent teaches the specific devices and circuits that are capable of being implemented in a mouse by using a low-cost photosource/photodetector pair as well as a single chip. microprocessor or an application specific integrated circuit. A person of ordinary skill in the art will understand that the methods and systems of the present invention are preferably implemented by use of one or more of the devices and circuits in the '913 patent. Accordingly, the '913 patent (including its drawings and specification) is incorporated herein by reference in its entirety.

Architecture, State Information and Invention Performance

Figure 3:
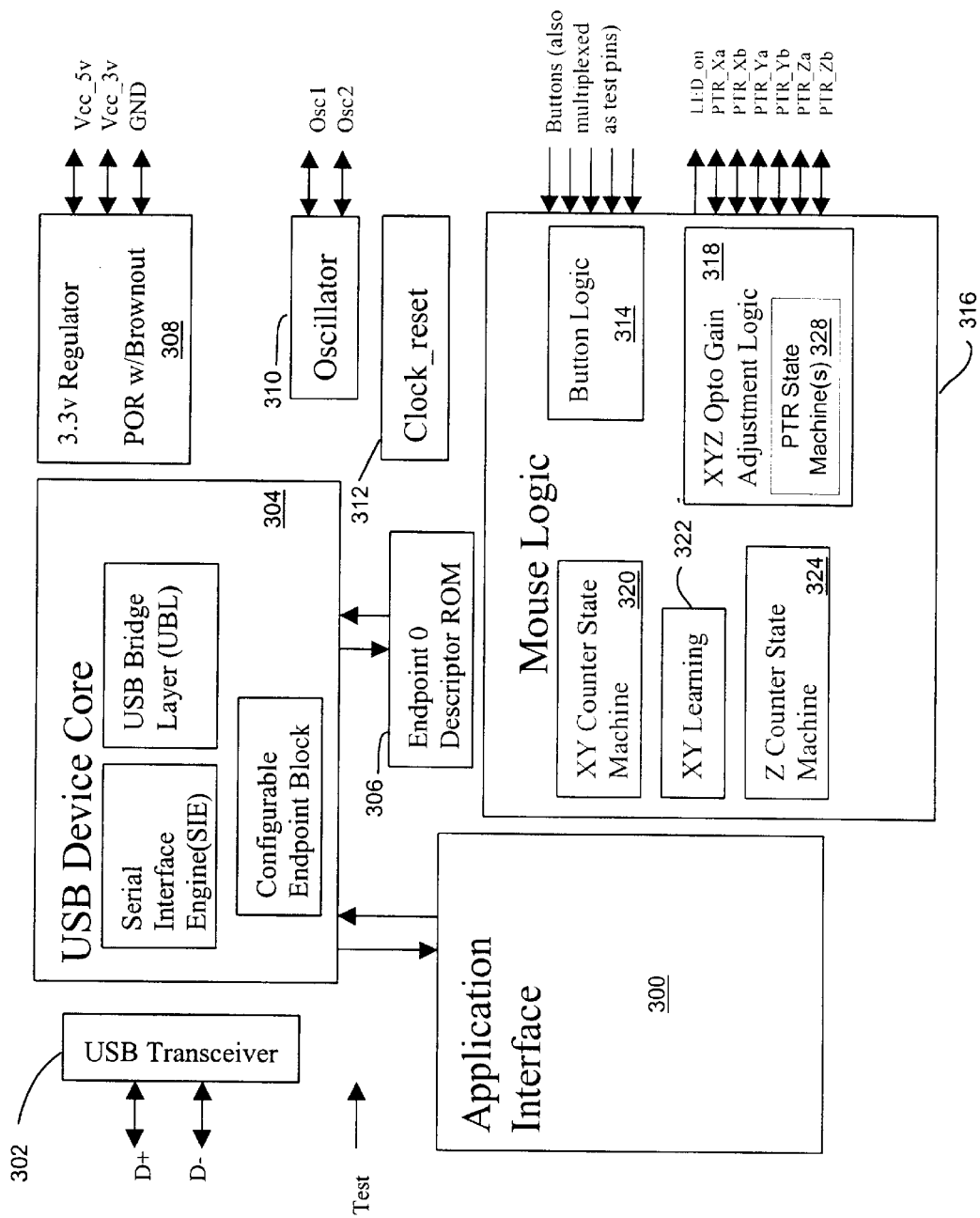
FIG. 3 is a block diagram of the exemplary components of a mouse capable of being used in accordance with the present invention.

The architecture of the major functional hardware modules of an application specific integrated circuit (ASIC) suitable for use with the present invention are set forth in FIG. 3. The application interface 300, USB transceiver 302, USB device core 304, descriptor ROM 306, voltage regulator 308, oscillator 310, clock reset 312 and button logic 314 modules are all well known to persons of skill in the art. Accordingly, these modules 300–314 are not discussed herein. The mouse logic module 316, on the other hand, comprises the essential inventive elements of the present invention and is therefore described herein in detail.

The mouse logic module 316 performs all functions necessary to generate the mouse packet data, which is ultimately provided to the computer 20. Other than the well-known button logic cell 314, the mouse logic module 316 includes the XYZ-opto-gain-adjustment-logic cell 318, the XY-counter-state machine 320, the XY-learning cell 322 and the Z-counter-state machine 324.

The goal of the XYZ-opto-gain-adjustment-logic cell 318 is to achieve approximately a 50% duty cycle on each PTR in each photodetection circuit 202, irrespective of each PTR's optical gain (assuming the mouse is moving at a constant speed). The XYZ-opto-gain-adjustment-logic cell 318 accomplishes this goal by turning on the LED 200 and monitoring the inputs to the photodetection circuit 202 and, more particularly, the inputs to each PTR in each photodetection circuit 202. By controlling the LED 200 and monitoring the inputs to each PTR, the XYZ-opto-gain-adjustment-logic cell 318 is able to determine when to adjust the response time ($T_{min}$) and thus adjust the sample rate. This enables the invention to optimize each PTR's duty cycle.

More particularly, the sample rate is dependent on each PTR's gain. In the present invention, the sample rate equals the sample time plus the time to discharge all of the PTRs. Sample time is the largest (i.e. longest) of two times the response time minus one ($2T_{min}-1$) for all the PTRs in the system. This dynamic sample rate is significant because the sample rate is increased during the circumstances where the $T_{min}$ resolution is the poorest (small $T_{min}$ values have poor resolution, resulting in poor duty cycle regulation). This dynamic sample rate extends the dynamic range by a factor of about two for fast optos, since the system sensitivity to duty cycle is lessened by the faster sample rate. The discharge time for each PTR is usually about 21 μsec (32 counts at 667 ns). Thus, the maximum sample rate is about 192 μsec and the nominal sample rate is about 30 μsec at a standard operating frequency of 1.5 MHz.

Preferably, each axis (i.e. the X-axis, Y-axis and Z-axis) on the mouse is treated separately and is independent of one another. Consequently, sample rate, sample time and $T_{min}$ for each axis can be separately monitored and adjusted as necessary in order to optimize the duty cycle. Preferably, the $T_{min}$ adjustment (i.e. learning) occurs every time a sample is taken from a PTR. This enables the $T_{min}$ value to be immediately optimized from a maximum or other value to the current ideal value. Optimization of the duty cycle is further enhanced by utilization of an increased digital resolution for the $T_{min}$ values. In prior art designs, only 8 $T_{min}$ values were available and used in an attempt to regulate the duty cycle. The present invention improves over the prior art by approximately 1600% by providing 128 available $T_{min}$ values. This large number of sample points provides substantially increased resolution on the duty cycle adjustment, thereby minimizing deviations from the 50% ideal duty cycle.

The increased digital resolution for the $T_{min}$ value on each axis is preferably achieved by use of a seven (7) bit register (i.e. $2^7$=128) for each PTR. The XYZ-opto-gain-adjustment-logic cell 318 preferably also includes a counter that used to keep track of the sample time. In this embodiment, an eight (8) bit counter is preferably used because the maximum sample time is 255 (i.e. $2T_{min}$–1) and because $2^8$=256. In addition, the XYZ-opto-gain-adjustment-logic cell 318 includes at least two PTR state machines 328 that monitor the outputs for each PTR for each axis and adjust the $T_{min}$ for each PTR as necessary. Preferably, the XYZ-opto-gain-adjustment-logic cell 318 has two PTR state machines 328 for each axis in the mouse 42. A digital comparator in the XYZ-opto-gain-adjustment-logic cell 318 compares the count in the counter to the $T_{min}$ value in each register as necessary.

For the X-axis and Y-axis, the XY-learning cell 322 has the ability to reset any one or more of the $T_{min}$ values for the X-axis and/or the Y-axis. Any time that there is no activity on an axis for the maximum sample time (i.e. 256 packets), the $T_{min}$ value for the axis is preferably set to its maximum value. Again, in this embodiment, the maximum $T_{min}$ value is 128. As previously discussed, setting the $T_{min}$ value to its maximum will increase the sample time and the sample rate.

Figure 4:
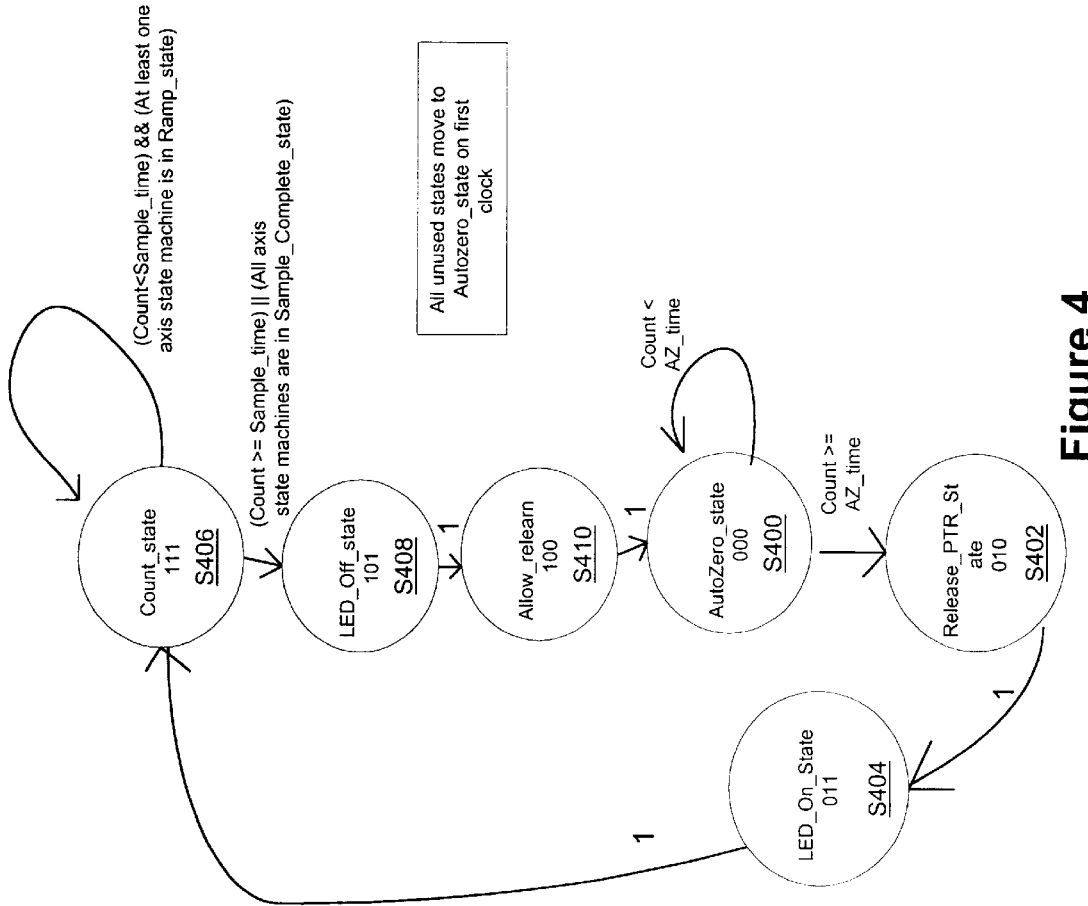
FIG. 4 is a flow chart depicting an exemplary process for the counter state machine.

An exemplary flow chart for each counter-state machine 320 and 324 used in conjunction with the present invention is shown in FIG. 4. The counter-state machines 320 and 324 are the master state machines for each axis they control. More particularly, the counter-state machines 320 and 324 control the sample rate, discharge time, counter, LED 200, PTRs, and PTR state machines 328 for each axis they control. When the counter-state machine 320 and 324 is started, the machine is in its AutoZero_state S400. The counter-state machine 320 and 324 stays in this state for a predetermined period of time (AZ_time or discharge time) to ensure that the photodetectors are completely discharged. The counter-state machine 320 and 324 next moves to the Release_PTR_state S402 and enables each PTR or other photodetector for the applicable axis. Each LED 200 or other photosource in the axis is then turned on S404.

The counter-state machine 320 and 324 then proceeds to the Count_state S406. The machine 320 and 324 will stay in this state S406 for so long as: (a) the current count is less than the sample time (i.e. $2T_{min}$–1); and (b) at least one PTR state machine 328 for the applicable axis is in its Ramp_state S500. If (a) the count is greater than or equal to the sample time, or (b) all PTR state machines for the applicable axis are in the Sample_Complete_state S502, then the machine 320 and 324 proceeds to the LED_Off_state S408. All LEDs 200 or other photosources for the applicable axis are then turned off S408. The state machine 320 and 324 moves to the state entitled Allow_relearn S410. If any $T_{min}$ adjustments need to be made, the adjustments are made during this state S410. Finally, the counter-state machine 320 and 324 returns to the AutoZero_state S400 and waits for the predetermined amount of time, AZ_time.

Figure 5:
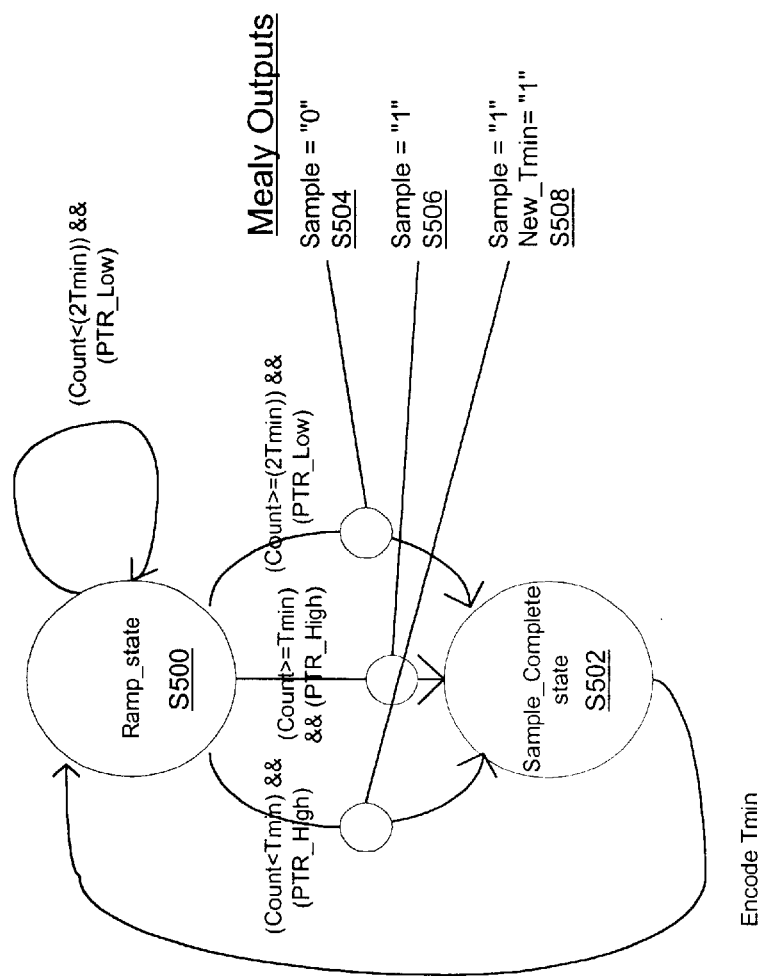
FIG. 5 is a flow chart depicting an exemplary process for the PTR state machine.

An exemplary flow chart for each PTR state machine 328 used in conjunction with the present invention is shown in FIG. 5. Each PTR state machine 328 controls the output for one PTR in its applicable axis. In addition, each PTR state machine adjusts the $T_{min}$ for each PTR as necessary in order to optimize its duty cycle. On start up, each PTR state machine 328 is in its Ramp_state S500. While in the Ramp_state S500, each PTR state machine 328 monitors its PTR, the applicable $T_{min}$ value and the counter. The PTR state machine 328 stays in this state S500 for so long as: (a) the counter's count is less than two times $T_{min}$ (i.e. $2T_{min}$), and (b) the output of the applicable PTR is low (i.e. the threshold voltage has not been crossed). When (a) the count becomes equal to or exceeds two times $T_{min}$ (i.e. $2T_{min}$) or (b) the output of the applicable PTR is high, then the PTR state machine 328 leaves the Ramp_state S500.

If the count is less than $T_{min}$ and the PTR is high S504, then the output for the photodetection circuit for the axis is "1" or "High." In addition, a flag is set (New_$T_{min}$) indicating that the current $T_{min}$ value is faster than the previously stored value. Accordingly, after the sample is complete S502, the new $T_{min}$ value will be stored in its applicable register. The sample time and sample rate are therefore also adjusted. If the count is greater than or equal to the $T_{min}$ value and the PTR is high, then the output for the photodetection circuit for the axis is similarly "1" or "High." However, this current $T_{min}$ value is not faster than the previously stored value and the new $T_{min}$ value will therefore not be stored. Lastly, if the count is greater than or equal to two times the response time (i.e. $2T_{min}$) and the PTR is low, then the output of the photodetection circuit is "0" or "Low." As shown, the PTR state machine 328 is essentially a slave to its applicable counter-state machine 320 and 328.

The significant benefits of the present invention can be seen in FIGS. 6A, 6B, 7A and 7B. There are three primary factors that impact the tracking performance of a mouse: phase, duty cycle regulation, and sample rate. The physical positions of the photosource (e.g. LED), the photodetector (e.g. PTR) and the encoder wheel determine the phase for a mouse. Movement and non-idealities in these component placements cause the phase to deviate from the ideal phase—90 degrees. The duty cycle regulation (also known as opto gain adjustment) attempts to achieve a 50% duty cycle for each PTR, regardless of the light gain of the component. Combining the phase and duty cycle of a given axis determines the minimum state width. The final factor is the sample rate. For the system to track mouse movement well, the sample rate must exceed the minimum state width.

Figure 6A:
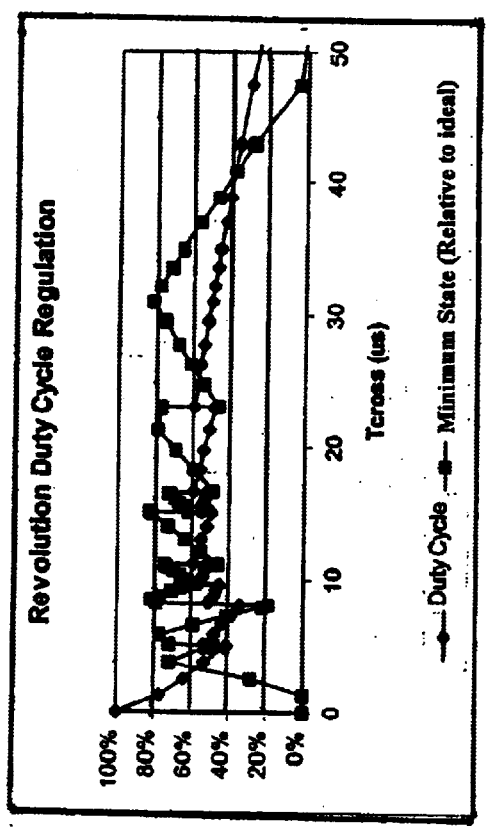
FIGS. 6A and 6B are charts illustrating simulated the duty cycle regulation and tracking performance of a prior art mouse.
Figure 6B:
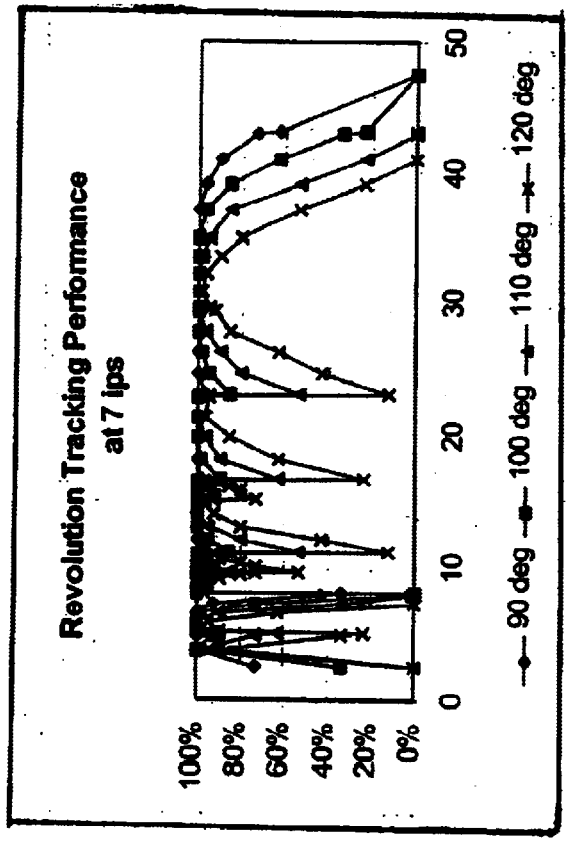

FIGS. 6A and 6B illustrate the simulated duty cycle regulation and tracking performance of a prior art mouse. As shown in FIG. 6A, the duty cycle of prior art mice is not well regulated. Nominal duty cycle regulation in the prior art is around 60%, not the desired duty cycle of 50%. Consequently, as shown in FIG. 6B, the mouse tracking performance is poor. The performance is even worse for non-optimum phase values of other than 90 degrees. However, when these results are compared to FIGS. 7A and 7B, the performance of the present invention is clearly superior.

Figure 7A:
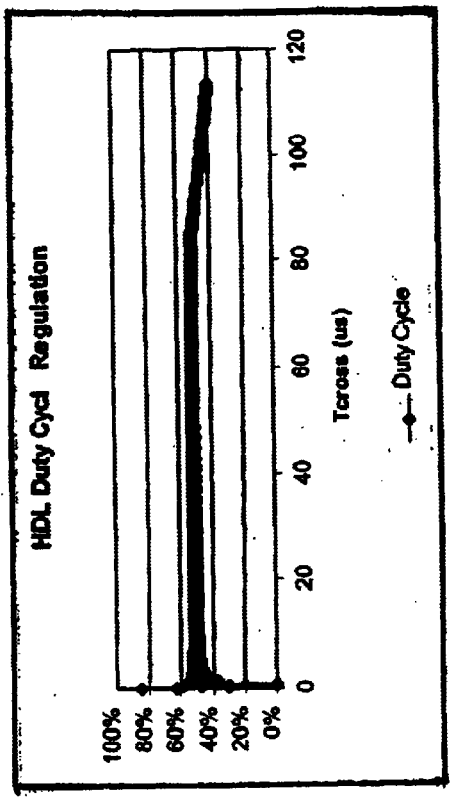
FIGS. 7A and 7B are charts illustrating simulated the duty cycle regulation and tracking performance of a mouse employing the present invention.
Figure 7B:
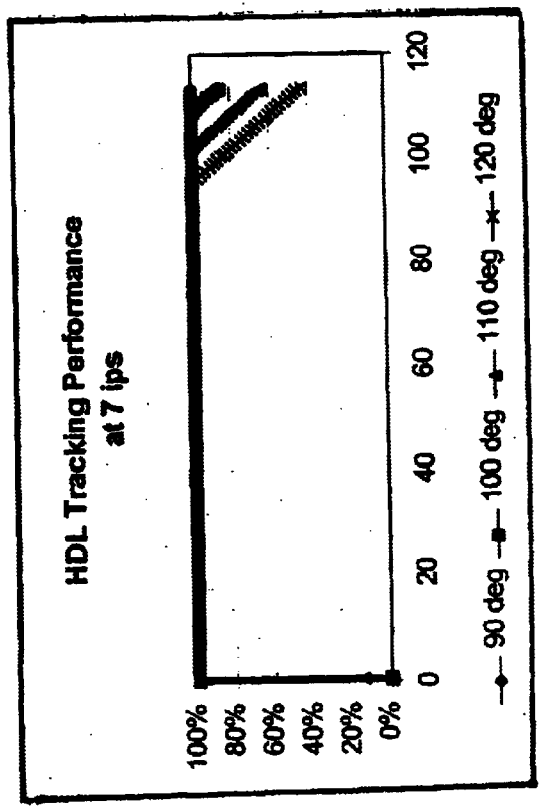

FIGS. 7A and 7B illustrate the simulated the duty cycle regulation and tracking performance of a mouse employing the present invention. Notably, the duty cycle regulation of the present invention is dramatically improved over the prior art for small $T_{cross}$ values as well as high $T_{cross}$ values. As shown, the duty cycle regulation is approximately 50% for all $T_{cross}$ values between 2 to 90 μsec. The duty cycle improvement is a result of the higher resolution for Tmin and the larger amount of ramp time allowed. This improved duty cycle regulation, combined with the dynamic sample rate, translates to almost 100% tracking performance from less than 1 μs to greater than 90 μs as shown in FIG. 7B. The total improved dynamic range of the system increases from about 6:1 for prior art to about 150:1 for the present invention.

In sum, the present invention overcomes the limitations and problems of the prior art by using a dynamic sample rate that is dependent on the response time ($T_{min}$), which is preferably adjusted each time a sample is evaluated. With this adjustment (i.e. learning), it only takes one sample to adjust $T_{min}$ from its maximum value to its optimum value. In addition, the present invention uses a higher $T_{min}$ resolution that increases mouse tracking performance by: obviating duty cycle errors, providing a better range of duty cycle adjustment, and providing a faster sample rate for fast optical components (i.e. small $T_{min}$ values). Thus, the present invention provides improved methods and systems for an improved mouse optical sampling scheme that enables a greater dynamic range of optical components to be used in a computer mouse.

Scope of Invention

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A method of determining motion in a mouse used in conjunction with a computer, the method comprising the steps of:
   a) using at least one counter state machine to control at least one PTR state machine;
   b) using said at least one PTR state machine at a sample rate to determine the appropriate output for the mouse;
   c) dynamically adjusting the sample rate in order to reduce said at least one PTR state machine's sensitivity to duty cycle errors; and
   d) providing the mouse output to the computer.

2. The method of claim 1 wherein the mouse includes at least one comparator, at least one light emitting diode, at least one phototransistor, at least one counter producing a counter output and at least one axis, and wherein the step of using at least one counter state machine further comprises the steps of:
   a) discharging the phototransistor;
   b) enabling the comparator;
   c) turning on the light emitting diode;
   d) using the counter to count for a period of time; and
   e) turning off the light emitting diode.

3. The method of claim 2 wherein the step of using said at least one PTR state machine to determine the appropriate output for the mouse further comprises the steps of:
   a) monitoring the output of the phototransistor and the counter;
   b) determining the mouse output to be a first value if the counter output is less than a response time ($T_{min}$) and if the output of the phototransistor is high;
   c) determining the mouse output to be the first value if the counter output is greater than or equal to the response time ($T_{min}$) and if the output of the phototransistor is high;
   d) determining the mouse output to be the second value if the counter output is greater than or equal to two times the response time ($T_{min}$); and
   e) providing the mouse output to the computer.

4. The method of claim 3 wherein the step of determining the mouse output to be a first value if the counter output is less than the response time ($T_{min}$) and if the output of the phototransistor is high further comprises the step of setting a flag to indicate that the response time ($T_{min}$) is a fastest value seen during operation.

5. The method of claim 4 wherein the response time ($T_{min}$) has a digital resolution of at least 128 values.

6. The method of claim 5 wherein the step of monitoring the phototransistor and the counter is performed at the sample rate, which is equal to a sample time plus a discharge time.

7. The method of claim 6 wherein the sample rate is dynamically adjusted based on the gain of the phototransistor.

8. The method of claim 6 wherein the sample time is equal to two times the response time minus one ($2T_{Min}-1$) and the discharge time is the time required to discharge each said at least one phototransistor.

9. The method of claim 7 wherein the sample rate is between 22 $\mu$sec and 190 $\mu$sec.

10. The method of claim 7 wherein the discharge time is about 21 $\mu$sec.

11. A method of determining motion in a mouse used in conjunction with a computer, the mouse including at least one comparator, a plurality of light emitting diodes, a plurality of phototransistors, at least one counter producing a counter output, and a plurality of axes independent from one another, said method comprising the steps of:
   a) discharging the phototransistors;
   b) enabling the comparator;
   c) turning on the light emitting diodes;
   d) using the counter to count for up to two times a response time (Tmin);
   e) monitoring the output of the phototransistors and the counter at a sample rate, the sample rate being equal to a sample time plus a discharge time;
   f) determining the mouse output to be a first value if the counter output is less than a response time (Tmin) and if the output of the phototransistors is high;
   g) determining the mouse output to be the first value if the counter output is greater than or equal to the response time (Tmin) and if the output of the phototransistors is high;
   h) if the counter output is less than the response time (Tmin) and if the output of the phototransistor is high, assigning the response time (Tmin) to equal the counter output, and correspondingly adjusting the sample rate;
   i) determining the mouse output to be the second value if the counter output is greater than or equal to two times the response time (Tmin);
   j) providing the mouse output to the computer; and
   k) turning off the light emitting diode.

12. The method of claim 11 further comprising the step of assigning the response time (Tmin) to equal a maximum value whenever the output of the phototransistors is low for a period of time.

13. The method of claim 11 wherein the sample time is equal to two times the response time minus one ($2T_{Min}-1$) and the discharge time is the time required to discharge all of the phototransistors.

14. The method of claim 13 wherein the discharge time is about 21 μsec, and the response time ($T_{min}$) has a digital resolution of at least 128 values.

15. A mouse logic system for providing a mouse output, including button-data information and motion information, to a computer comprising:
   a) an adjustment component utilizing a dynamic sample rate for determining the motion information;
   b) at least one counter state machine for providing counter-state information to the adjustment component;
   c) a XY learning component for determining when to reset X axis and Y axis response time (Tmin) values to their maximum value, said XY learning component communicating with the adjustment component; and
   d) a button logic component for providing button-data information on external mouse switches,
      whereby the motion information and the button-data information are provided by the mouse logic system to the computer.

16. The logic system of claim 15 wherein the adjustment component includes at least one PTR state machine that determine the output for each phototransistor contained in the adjustment component, said at least one PTR state machine also adjusting the response time ($T_{min}$) for each said phototransistor as necessary.

17. The logic system of claim 16 wherein said at least one counter state machine controls at least one of: a sample rate for said at least one PTR state machine, a discharge time for each said phototransistor, a counter or at least one light emitting diode.

18. The logic system of claim 17 wherein said at least one counter state machine controls each said at least one PTR state machine.

19. A mouse logic system for providing a mouse output, including button-data information and motion information, to a computer comprising:
   a) an adjustment component for determining the motion information, said adjustment component includes at least one PTR state machine that determines the output for each phototransistor contained in the adjustment component, said at least one PTR state machine also adjusting a response time (Tmin), and correspondingly adjusting a sample rate, for each said phototransistor as necessary.
   b) at least one counter state machine for providing counter-state information to the adjustment component, said at least one counter state machine controlling at least one of: the sample rate for said at least one PTR state machine, a discharge time for each said phototransistor, a counter or at least one light emitting diode;
   c) a XY learning component for determining when to reset X axis and Y axis response time (Tmin) values to their maximum value, said XY learning component communicating with the adjustment component; and
   d) a button logic component for providing button-data information on external mouse switches,
      whereby the motion information and the button-data information are provided by the mouse logic system to the computer.

20. The logic system of claim 19 wherein said at least one counter state machine controls each said at least one PTR state machine.

* * * * *